United States Patent [19]

Anderson et al.

[11] Patent Number: 5,208,190
[45] Date of Patent: May 4, 1993

[54] MICROPOROUS ALUMINA CERAMIC MEMBRANES

[75] Inventors: Marc A. Anderson; Guangyao Sheng, both of Madison, Wis.

[73] Assignee: Wisconsin Alumni Research Foundation, Madison, Wis.

[21] Appl. No.: 773,168

[22] Filed: Oct. 8, 1991

[51] Int. Cl.$^5$ .............................................. C04B 35/10
[52] U.S. Cl. ..................................... 501/12; 501/127
[58] Field of Search ................................. 501/12, 127; 210/500.25, 500.26, 510.1

[56] References Cited

U.S. PATENT DOCUMENTS

| | | | |
|---|---|---|---|
| 3,892,580 | 7/1975 | Messing | 106/41 |
| 4,764,357 | 8/1988 | Sherif et al. | 423/338 |
| 4,800,051 | 1/1989 | Yan | 264/56 |
| 4,801,399 | 1/1989 | Clark et al. | 252/315.01 |
| 4,929,406 | 5/1990 | Abe et al. | 264/45.5 |
| 5,006,248 | 4/1991 | Anderson et al. | 210/500.15 |

FOREIGN PATENT DOCUMENTS

88/02537 2/1989 PCT Int'l Appl. .

OTHER PUBLICATIONS

Anderson M. A., et al., "Titania and Alumina Ceramic Membranes," 39 *J. Memb. Sci.* 243-258 (1988).
Asaeda, M. and Du, L. D., "Separation of Alcohol/Water Gaseous Mixtures by Thin Ceramic Membrane," *Chem. Eng. Japan* 19[1]: 72-77 (1986).
Johnson, D. W., "Sol-Gel Processing of Ceramics and Glass," *Am. Ceram. Soc. Bull.* 64[12]: 1597-1602 (1985).
Leenaars, A. F. M. and Burggraaf, A. J., "The Preparation and Characterization of Alumina Membranes with Ultra-Fine Pores Part 4, Ultrafiltration and Hyperfiltration Experiments," *J. Memb. Sci.* 24: 261-270 (1985).
Yoldas, B. E., "A Transparent Porous Alumina," *Am. Ceram. Soc. Bull.* 54[3]: 286-288 (1975).
Yoldas, B. E., "Alumina Sol Preparation from Alkoxides," *Am. Ceram. Soc. Bull.* 51[3]: 289-290 (1975).
Yoldas, B. E., "Preparation of Glasses and Ceramics from Metal-Organic Compounds," *J. Mater. Sci.* 12: 1203-1208 (Jun. 1977).
Leenaars, A. F. M., et al., "Porous alumina membranes": Chemtech 560-564 (Sep. 1986).

*Primary Examiner*—Karl Group
*Assistant Examiner*—Chris Gallo
*Attorney, Agent, or Firm*—Quarles & Brady

[57] ABSTRACT

Several methods are disclosed for the preparation microporous alumina ceramic membranes. For the first time, porous alumina membranes are made which have mean pore sizes less than 100 Angstroms and substantially no pores larger than that size. The methods are based on improved sol-gel techniques.

11 Claims, 1 Drawing Sheet

MICROPOROUS ALUMINA CERAMIC MEMBRANES

STATEMENT REGARDING FEDERALLY SPONSORED RESEARCH

This invention was made with United States government support awarded by the Department of Energy (DOE), Grant #DE-AS07-86ID12626. The United States Government has certain rights in this invention.

FIELD OF THE INVENTION

The present invention relates to the field of ceramic membranes in general and relates in particular, to the field of metal oxide ceramic membranes with very small sized pores. The materials are referred to here as microporous ceramic membranes.

BACKGROUND OF THE INVENTION

Ceramic membranes have a variety of industrial and scientific uses, the most common of which is use in separation processes. Organic membranes are often currently used in industry for separation processes, but ceramic membranes offer several advantages over organic membranes. Ceramic membranes are more resistant than organic membranes to organic solvents, chlorine, and extremes of pH. Ceramic membranes are also inherently more stable at high temperatures, thus allowing more efficient sterilization of process equipment than is possible with organic membranes. Ceramic membranes are generally quite resistant to microbial or biological degradation, which can occasionally be a problem with organic membranes. Ceramic membranes are also more mechanically stable under high pressures.

The mechanism of operation and types of separations which can be achieved by ceramic membranes are discussed in general by Asaeda et al., *Jour. of Chem. Eng. of Japan*, 19[1]:72–77 (1986). At least one line of ceramic filters is currently marketed under the trade name "Ceraflo" by the Norton Company of Worcester, Massachusetts.

Ceramic membranes may be formed in particulate or polymeric manners. Anderson, et al., *J. Memb. Sci* 39:243–258 (1988), describes different methods of making both particulate and polymeric sols from transition metal oxides. In general, particulate membranes have a smaller average pore diameter and a narrower pore size distribution as compared to polymeric membranes.

Particulate ceramic membranes are typically formed through a process beginning with metal-organic compounds. The compounds are hydrolyzed to form small metal oxide clusters which in turn aggregate to form metal oxide particles. The particles are fused into a unitary ceramic material. The gaps between the fused particles form a series of pores in the membrane.

The creation of these metal oxide ceramic membranes is generally conducted through a sol-gel procedure. Usually, the metal oxide is initiated into the process as a metal alkoxide solution. The metal is hydrolyzed to metal hydroxide monomers, clusters or particles, depending on the quantity of solvent used. The insoluble metal oxide particles are then peptized by the addition of an acid which causes the particles of the metal oxide to have a greater tendency to remain in suspension, presumably due to charges acquired by the particles during the peptizing process.

Such a sol can be evaporated to form a xerogel or simple gel, which is a semi-solid material. Further evaporation, and then sintering, of the gel results in a durable rigid material which can either be formed as an unsupported membrane or as a supported membrane coated onto a substrate. The substrate for the membrane can be either porous or non-porous and either metallic or non-metallic, depending on the particular application.

Two current limitations on the use of ceramic membranes are the elements which can be used to fabricate the membranes and the membrane pore size and range. With regard to the composition of the membranes, ceramic membranes have been created using many materials. For example, Leenaars et al., *Jour. of Membrane Science*, 24:261–270 (1985), report the use of the sol-gel procedure to prepare supported and unsupported alumina membranes. However, the sol-gel process used had inherent lower limits as to the size of the particles that could be produced in the sol thus making a lower limit on the size of the pores in the membranes. Ceramic membranes composed of titania, zirconia and other metal oxides have also been reported.

Investigators have previously investigated alumina membranes. In particular, Yoldas conducted significant research on the fabrication of gamma-alumina membranes made by a sol-gel process. Yoldas was able to achieve a relatively small particle size in the particles in the membranes and was able to make porous bodies. Yoldas, *Jour. Mat. Sci.*, 12:6, pp. 1203–1208 (1977). In general, however, the method of Yoldas did not permit sufficiently fine control of the sol-gel process to result in useful uniformity of the particles, and the resulting membranes, so as to achieve useful filtration materials. For example, in his work with transparent alumina membranes, Yoldas reported that he was able to achieve materials that had small pores, having a radius less than 50 Angstrom, but only in materials which also had "larger river-like pores," having a significantly higher radius and contributing significantly to the porosity of the material. Yoldas, *Cer. Bull.*, 54:3, 286–288 (1975).

In order for the materials to be useful for filtration, the pore size of the material needs to be within a relatively narrow range so that larger species are excluded from the fluid passing through the filter. It is also useful to make materials which have pore sizes of less than 20 Angstroms, which are particularly useful for certain applications. For example, for reverse osmosis, molecular sieving and gas separation applications, the ability to make porous membranes having a narrowly defined range of pore sizes, with the average size being less than 20 Angstroms, has significant advantage.

SUMMARY OF THE INVENTION

The present invention is a method for creating alumina ceramic membranes and the membranes made by the method. The method involves the creation of a stable and controlled sol of alumina particles created by a peptizing process. The sol is then heated. If the resulting sol is cloudy, the cloudy portion of the sol is then separated from the clear fraction. The clear sol may then be evaporated to form xerogels, which may be fired to produce clear particulate alumina ceramic membranes having mean pore sizes less than 50 Angstroms and a relatively narrow distribution of pore size.

It is an object of the present invention to provide several methods of making particulate alumina porous membranes which can be made to have a narrow range of pore size distribution.

It is another object of the present invention to construct a microporous alumina particulate membrane having pores of an average size of less than 50 Angstroms in diameter and substantially no pores of greater than 50 Angstroms in diameter.

Other objects, advantages and features of the present invention will become apparent from the following specification.

BRIEF DESCRIPTION OF THE DRAWING FIGURE

FIG. 1 is a graphical illustration of a typical pore size distribution for an alumina oxide ceramic membrane made in accordance with the present invention.

DETAILED DESCRIPTION OF THE INVENTION

Figure 1:
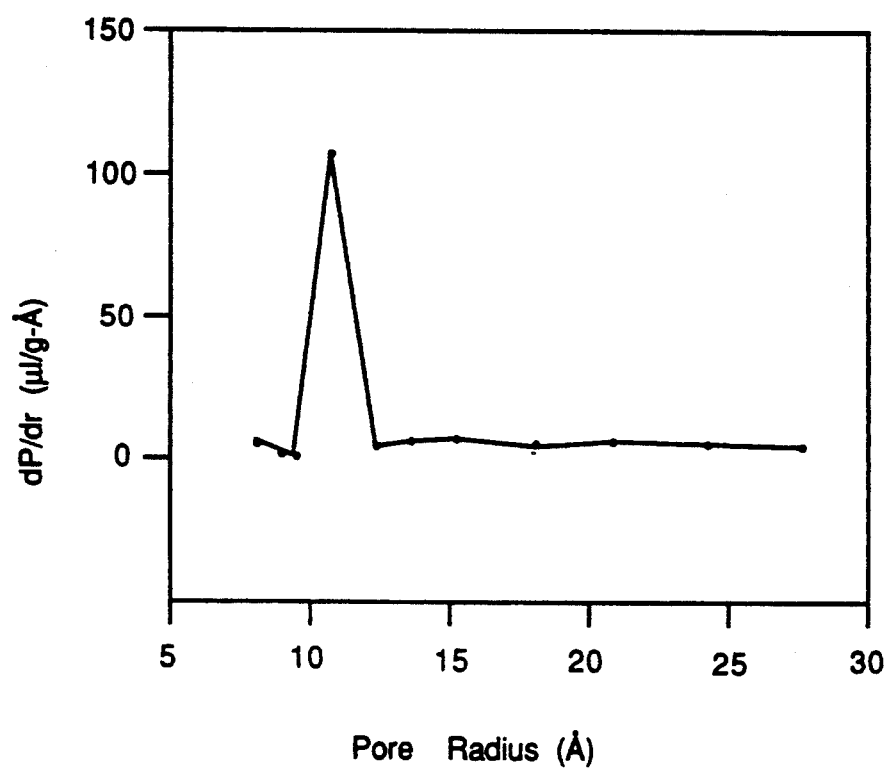

The method of the present invention requires the hydrolysis of an aluminum alkoxide under conditions so as to favor the formation of extremely small particles of alumina in the resulting colloidal suspension, or sol. According to the theory of homogeneous nucleation of solids in liquid dispersions, performing hydrolysis of a metal alkoxide at a lower temperature (i.e. room temperature, 25° C.) should lead to smaller, more numerous, particles in the colloidal suspension as opposed to prior high temperature hydrolysis methods. In the alumina colloidal suspension system, the use of an acidic hydrolysis increases the hydrolysis rate of the aluminum alkoxide, and therefore also tends to form smaller nuclei or particles in the sol. However, hydrolysis of alumina tri-sec-butoxide (ATSB) at temperatures below 80° C. eventually tends to produce bayerite, a material which cannot be peptized. Three methods are described below which are capable of avoiding this difficulty and are capable of resulting in sols which contain uniformly small particles which can be dried and fired into membranes having a uniform distribution of small pore sizes.

In the past, alumina ceramic membranes were prepared using a sol-gel methodology in which the hydroxides produced by hydrolysis of the aluminum alkoxide with hot water (greater than 80° C.) were peptized with nitric acid to form stable sols. However, since typically the acid peptization step was conducted after the addition of the hot water, the high temperature hydrolysis which thus occurred led to large alumina particles. Thus, the methods described below are intended to produce small particles and are thus intended to avoid peptizing the alkoxide at high temperature. Three alternative methods have been developed to achieve stable colloidal suspensions of alumina particles without high temperature peptization.

The first method is based on the hydrolysis of ATSB at temperatures below 80° C. Hydrolysis at this temperature initially produces an amorphous aluminum monohydroxite which converts, slowly to bayerite, a material that cannot be peptized at low temperatures. However, after hydrolysis, if the material is quickly heated to above 80° C. and refluxed under vigorous stirring, the amorphous phase converts to boehmite which can readily be peptized. Once the boehmite particles are formed, their size is not affected by the nitric acid addition and the heating, and the particles retain the small size which was achieved during the low temperature hydrolysis. If the solution appears cloudy at this stage, centrifugation may be used to remove the larger particles from the sol. Using this procedure, a stable transparent sol solution can be obtained, and membranes produced from those sols which have a uniform and stable small pore size.

The second method begins with separate quantities of ATSB and water dissolved in separate and equal quantities of s-butyl alcohol. The water and alcohol mixture also contains a small quantity of nitric acid. The two solutions are slowly mixed together by dripping the water phase into ATSB under stirring. The solution is then aged for an additional two hours. The result is an alcoholic sol solution and which has a composition of equal parts alumina ions and water molecules in an alcoholic transparent sol.

All of these methods will produce colloidal sols containing a suspension or solution of very small alumina particles. Such sols can then be dried, by controlled evaporation, to result in xerogels, which are semi-solid material containing the alumina particles. The xerogels will range from slightly cloudy to colorless and clear when the particles are of a size below less than 100 Angstroms. Such xerogels can then be fired at temperatures not to exceed about 500° C., for two to four hours, to result in fused particulate ceramic membranes. Such gels can be coated onto supports to create supported membranes or, alternatively, can be fired as planar sheets which then become unsupported aluminum oxide membranes. The unsupported aluminum oxide membranes are not transparent. Pore sizes less than 100 Angstroms can readily be made and membranes made using the above processes have had pore radii as low as 11 Angstroms. Such aluminum oxide membranes having a size range less than about 50 Angstrom have utility for use in ultrafiltration and reverse osmosis.

EXAMPLES

1. Preparation of Sol—Method 1

The starting material used for all the examples below is aluminum tri-sec-butoxide (ATSB), which is a readily available commercial material (Aldrich). In this method, 0.0112 moles of ATSB was directly reacted with 40 ml of cold water to which had previously been added 70 microliters of nitric acid. These proportions were calculated to give a ratio of $H+$ to $Al^{3+}$ (molar ratio) equal to 0.1. The result was the formation of an unstable amorphous monohydroxide.

The hydrolysis reaction was allowed to continue for ten minutes. Then the vessel containing the reactants was quickly heated to above 80° C. The solution was refluxed by vigorous stirring. At this point the amorphous phase converted to a boehmite suspension. After continuous vigorous stirring for about two hours, a stable sol solution is obtained. The stirring could be ceased without inducing instability in the sol solution.

The resulting sol was stable and clear. It had a pH of 3.25.

2. Preparation of Sol—Method 2

Equal quantities of ATSB and deionized water containing a small quantity of nitric acid were separately dissolved in equal quantities of S-butyl alcohol. The two solutions were mixed together by dropping slowly the water phase into the ATSB phase slowly, while vigorously stirring. The solution was then aged for an additional two hours. Finally the sol solution was obtained. The solution was not completely stable. The concentration of aluminum ions was 0.2M, which was the same composition of water molecules contained within the sol.

3. Preparation of Membranes from the Sols

The sol solutions obtained from each of the above two methods were transferred to plastic petri dishes which were uncovered and placed in a humidity-controlled box at room temperature. The slow drying thus initiated was continued until transparent xerogels were formed. The dried gels were fired at 500° C. for at least two hours. Non-transparent unsupported $Al_2O_3$ membranes were obtained from the process.

Characterization of the membranes indicated mean pore diameters less than 50 Angstroms from various replicates of the examples. In fact, the results indicated that particle diameters in some of the membranes were under 50 Angstroms resulting in pore radii of about 11 Angstroms. The typical membrane had a surface area in excess of 200 square meters per gram with a porosity of 33%. All of the membranes produced had surface areas in excess of 100 square meters per gram and porosities in excess of 25%.

FIG. 1 illustrates the characteristic spread of the pore radius in a membrane made by this process. This particular membrane had a pore radius centered on about 11 Angstroms. Note that there were substantially no pores detected which had a radii exceeding 20 Angstroms, and very few pores which had a radii exceeding 13 Angstroms. In other words, not only was the material microporous, the size of the pores through the membrane had a very narrow range of distribution. Substantially no pores exceeded twice the mean pore size. Thus the material is particularly suitable for use in filtration applications where regular and tightly controlled pore size is a very desirable parameter.

To verify the stability of sols produced through this process, one boehmite sol was aged for up to three weeks. The alumina membranes were prepared from this same sol at various times during the aging process. The surface area of all of the membranes produced was in excess of 200 and 210 $m^2$ per gram. The mean pore radii of all of the membranes were measured to be about 11 Angstroms. The consistency of the result verified the stability of the sols.

We claim:

1. A method of making microporous alumina ceramic membranes comprising the steps of
   (a) introducing an aluminum alkoxide into aqueous solution;
   (b) peptizing the solution by the addition of acid at a temperature less than 80° C. under conditions that favor the formation of small alumina particles in the solution;
   (c) recovering from the solution a stable sol;
   (d) removing solvent from the sol to form a xerogel; and
   (e) firing the xerogel at temperatures up to 500° C. to obtain a porous ceramic alumina membrane having a narrow distribution of pore sizes.

2. The method of claim 1 wherein the peptizing step is conducted at room temperature and the recovering step includes subsequently heating the solution over 80° C. and vigorously stirring the solution so that boehmite particles are formed in the sol.

3. The method of claim 1 wherein the peptizing step is conducted at room temperature and at sufficient acidity to dissolve the aluminum particles formed and the recovering step includes dialyzation of the solution to form a sol.

4. The method of claim 1 wherein the peptizing step is conducted at room temperature in alcoholic solution with a very limited amount of water and the recovering step includes aging the peptized alcoholic solution.

5. A method of making microporous alumina ceramic membranes comprising the steps of
   (a) introducing an aluminum alkoxide into aqueous solution;
   (b) peptizing the solution by the addition of acid at a temperature less than 80° C. under conditions that favor the formation of small alumina particles in the solution;
   (c) heating the solution to over 80° C. to induce formation of boehmite particles in the solution;
   (d) removing solvent from the solution to form a xerogel; and
   (e) firing the xerogel at temperatures up to 500° C. to obtain a porous ceramic alumina membrane having a narrow distribution of pore sizes.

6. The method of claim 5 further including the step, after Step (c), of centrifugation to remove large particles from the solution.

7. A method of making microporous alumina ceramic membranes comprising the steps of
   (a) introducing an aluminum alkoxide into aqueous solution;
   (b) peptizing the solution by the addition of acid at a temperature less than 80° C. under dilute conditions that inhibit the formation of large alumina particles in the solution;
   (c) concentrating the particle in the solution to form a stable alumina sol;
   (d) removing solvent from the sol to form a xerogel; and
   (e) firing the xerogel at temperatures up to 500° C. to obtain a porous ceramic alumina membrane having a narrow distribution of pore sizes.

8. The method of claim 7 wherein the concentration step is conducted by dialysis.

9. A method of making microporous alumina ceramic membranes comprising the steps of
   (a) introducing an aluminum alkoxide into alcoholic solution with a limited amount of water;
   (b) peptizing the solution by the addition of acid at a temperature less than 80° C. under conditions that favor the formation of small particles in the solution;
   (c) aging the solution until a stable sol is formed;
   (d) removing solvent from the sol to form a xerogel; and
   (e) firing the xerogel at temperatures up to 500° C. to obtain a porous ceramic alumina membrane having a narrow distribution of pore sizes.

10. A microporous alumina ceramic membrane, the membrane having a specific surface area in excess of 100 square meters per gram and a mean pore size of less than 100 Angstroms and being substantially free of pores having a radius in excess of 100 Angstroms.

11. The microporous alumina membrane of claim 10 wherein the mean radius of the pores of the membrane is less than 20 Angstroms.

* * * * *